United States Patent
Berry et al.

(10) Patent No.: US 7,708,803 B2
(45) Date of Patent: May 4, 2010

(54) METHOD AND APPARATUS FOR THE ENHANCED REMOVAL OF AEROSOLS FROM A GAS STREAM

(75) Inventors: Mark Simpson Berry, West Birmingham, AL (US); Ramsay Chang, Mountain View, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 496 days.

(21) Appl. No.: 11/592,604

(22) Filed: Nov. 3, 2006

(65) Prior Publication Data
US 2008/0105120 A1    May 8, 2008

(51) Int. Cl.
*B03C 3/019*    (2006.01)

(52) U.S. Cl. .......... 95/59; 55/372; 95/70; 95/76; 95/116; 95/148; 95/214; 96/32; 96/42; 96/55; 96/143; 96/154

(58) Field of Classification Search .......... 95/59, 95/70, 74–77, 214, 215, 116, 134, 135, 148; 96/32, 42, 44, 55, 59, 69, 98, 363, 41, 43, 96/143, 144, 154; 55/372
See application file for complete search history.

(56) References Cited

U.S. PATENT DOCUMENTS

| | | | | |
|---|---|---|---|---|
| 2,067,303 | A * | 1/1937 | Tennison | 96/287 |
| 2,486,877 | A * | 11/1949 | Ransburg et al. | 96/42 |
| 2,593,377 | A * | 4/1952 | Wintermute | 95/70 |
| 3,768,258 | A * | 10/1973 | Smith et al. | 60/275 |
| 3,932,151 | A * | 1/1976 | Lau | 96/325 |
| 4,049,399 | A | 9/1977 | Teller | |
| 4,255,166 | A | 3/1981 | Gernand et al. | |
| 4,544,542 | A | 10/1985 | Angevine et al. | |
| 4,613,487 | A | 9/1986 | Yoon et al. | |
| 4,969,934 | A | 11/1990 | Kusik et al. | |
| 5,024,681 | A | 6/1991 | Chang | |
| 5,158,580 | A | 10/1992 | Chang | |
| 5,217,511 | A * | 6/1993 | Plaks et al. | 96/55 |

(Continued)

FOREIGN PATENT DOCUMENTS

| | | | | |
|---|---|---|---|---|
| JP | 53-140675 A | * | 12/1978 | 96/55 |

(Continued)

OTHER PUBLICATIONS

U.S. Appl. No. 12/411,255, filed Mar. 25, 2009, Chang.

*Primary Examiner*—Richard L Chiesa
(74) *Attorney, Agent, or Firm*—Owens Tarabichi LLP (57) ABSTRACT

The invention provides methods and apparatuses for removing additional aerosols and in some cases additional particulate matter from a gas stream, wherein a certain portion of such aerosols and particulate matter has already been removed using a primary aerosol and particulate collection device. In some embodiments, the invention includes a method for removing additional aerosols from a gas stream, including passing a gas stream having a plurality of aerosols through a gas duct; removing a first portion of the plurality of the aerosols using a primary aerosol collector; passing the gas steam through a screen; collecting at least a second portion of the plurality of aerosols on the screen; and cleaning a portion of the screen outside of the gas duct. The invention also provides various apparatuses for use in performing the method of the invention.

20 Claims, 9 Drawing Sheets

U.S. PATENT DOCUMENTS

| | | | |
|---|---|---|---|
| 5,250,267 A | 10/1993 | Johnson et al. | |
| 5,336,299 A * | 8/1994 | Savell | 95/70 |
| 5,476,538 A * | 12/1995 | Nishio et al. | 95/70 |
| 5,505,766 A | 4/1996 | Chang | |
| 5,854,173 A | 12/1998 | Chang et al. | |
| 6,136,072 A | 10/2000 | Sjostrom et al. | |
| 6,185,934 B1 * | 2/2001 | Teboul | 60/297 |
| 6,558,454 B1 | 5/2003 | Chang et al. | |
| 6,712,878 B2 | 3/2004 | Chang et al. | |
| 6,858,064 B2 * | 2/2005 | Bologa et al. | 95/65 |
| 6,878,192 B2 | 4/2005 | Pasic | |
| 6,905,534 B2 * | 6/2005 | Chang et al. | 96/55 |
| 6,958,088 B1 * | 10/2005 | Moriyama | 96/39 |
| 2004/0045437 A1 * | 3/2004 | Chang et al. | 95/134 |
| 2004/0118285 A1 * | 6/2004 | Kim et al. | 96/55 |
| 2004/0123622 A1 * | 7/2004 | Yuzawa et al. | 62/475 |
| 2005/0132880 A1 * | 6/2005 | Chang | 95/63 |
| 2006/0029533 A1 | 2/2006 | DeBerry | |
| 2006/0162564 A1 * | 7/2006 | Paterson et al. | 96/55 |
| 2006/0186054 A1 * | 8/2006 | Webb et al. | 210/688 |
| 2008/0105121 A1 * | 5/2008 | Chang | 95/70 |
| 2008/0115704 A1 | 5/2008 | Berry | |

FOREIGN PATENT DOCUMENTS

JP  1-288354 A * 11/1989 ..................... 96/55

* cited by examiner

METHOD AND APPARATUS FOR THE ENHANCED REMOVAL OF AEROSOLS FROM A GAS STREAM

BACKGROUND

1. Background of the Invention

The invention relates generally to the enhanced removal of aerosols, such as fine liquid droplets, and particulate matter from a gas stream. More specifically, the invention is directed to the removal of aerosols and particulate matter, and in some embodiments a vapor phase contaminant, from the flue gas of a combustion system.

2. Description of Related Art

The emission of aerosols, such as particulate matter or fly ash and acid mist, from flue gas generated by utility power plants is an important issue. Several technologies have been used to remove such aerosols including wet and dry electrostatic precipitators, wet and dry scrubbers, and baghouses. However, these existing collectors are required to handle even higher amounts of aerosols as more materials such as sorbents for mercury and acid gas control are being injected into the flue gas stream and new pollution control devices such as selective reduction (SCR) catalysts increase sulfuric acid mist formation. The increased aerosol loading leads to increased stack particulate and acid mist emissions. In addition, environmental regulations are becoming increasingly more stringent, requiring power plants to reduce stack aerosol emissions even further. Therefore, it is desirable to improve and enhance the methods and equipment currently used for removing aerosols, including particulate matter or fly ash and acid mists, from gas streams. In particular, there is a need for methods and apparatuses or "polishers" that supplement the removal of particulate matter or fly ash obtained using traditional equipment.

In addition, special attention has been given to emissions of vaporous trace contaminants, such as mercury (Hg), in flue gas generated by utility power plants and the impact such trace contaminants may have on the environment. Generally, trace contaminants include those vaporous chemical species present in relatively low concentrations in a given gas stream. For example, mercury is present in flue gas from a fossil-fuel-fired combustion system in very low concentrations (<1 ppm) and forms a number of volatile compounds that are difficult to remove. Specially designed and costly emissions-control systems are required to effectively capture these trace amounts of mercury. Therefore, there is a need to improve the methods and equipment used for removing such vaporous trace contaminants from gas streams.

SUMMARY OF THE INVENTION

The invention provides methods and apparatuses for removing additional aerosols and in some cases additional particulate matter from a gas stream, wherein a certain portion of such aerosols and particulate matter has already been removed using a primary aerosol and particulate collection device. In effect, the methods and apparatuses of the invention provide a way to polish a gas stream.

In some embodiments, the invention comprises a method for removing additional aerosols from a gas stream that has aerosols previously removed by a primary aerosol collector, comprising passing a gas stream comprising a plurality of aerosols through a gas duct; removing a first portion of the plurality of said aerosols using a primary aerosol collector; passing the gas stream through a screen; and collecting at least a second portion of the plurality of aerosols on the screen.

In other embodiments, the invention provides a method for removing additional aerosols from a gas stream that has aerosols previously removed by a primary aerosol collector further comprising removing a portion of said vapor phase contaminant using a sorbent disposed on the screen or using a screen constructed from a sorbent. In other embodiments, the invention provides a method for removing additional aerosols from a gas stream that has aerosols previously removed by a primary aerosol collector further comprising passing one portion of the screen out of the gas duct; regenerating the sorbent on that portion of the screen while another portion of the screen is in use; and returning the regenerated portion of the screen back into the gas duct and into contact with the gas stream. In other embodiments, the screen may be electrically charged to enhance the removal of aerosol particles and particulate matter. The invention also provides various apparatuses for use in performing the method of the invention. Other embodiments and features of the invention are described in more detail below in connection with the Figures.

DETAILED DESCRIPTION OF THE INVENTION

Generally, the invention comprises various methods and apparatuses for removing aerosols from a gas stream. It should be appreciated that the term "aerosol" is utilized in the broadest sense and includes liquid aerosols such as liquid droplets or mist (e.g., condensed $SO_3$ or sulfuric acid mist) in a gas stream. Further, the liquid aerosols may also be referred to as aerosol particles.

In some embodiments, the invention comprises methods to polish a gas stream and apparatuses that can be used as polishers with respect to the removal of aerosols and with respect to particulate matter from a gas stream. For example, in some embodiments, the methods and apparatuses of the invention are used downstream of a primary aerosol collector that removes a certain amount of aerosols and particulate matter from a gas stream. For example, the primary aerosol collector may be a typical particulate collection device that removes a significant portion of aerosols and particulate matter from the gas stream. The polishing methods and apparatuses are then used to remove additional aerosols and particulate matter that is not removed by the upstream aerosol collection device, thereby "polishing" the gas stream. In other embodiments of the invention, the removal of aerosols is combined not only with the removal of particulate matter but also with the removal of one or more vapor phase contaminants, such as vaporous trace metal contaminants, including, for example, mercury (Hg).

The following describes these and other exemplary embodiments of the present invention in conjunction with the accompanying drawings, wherein like reference numbers refer to similar structure or features. It should be appreciated, however, that the drawings are not intended to be drawn to scale. Further, the following descriptions are not intended to be limiting and are only exemplary embodiments of the present invention. It will be apparent to one of skill in the art that certain modifications may be made to the various exemplary embodiments as described. Such modifications are intended to be within the scope of the present invention.

Figure 1:
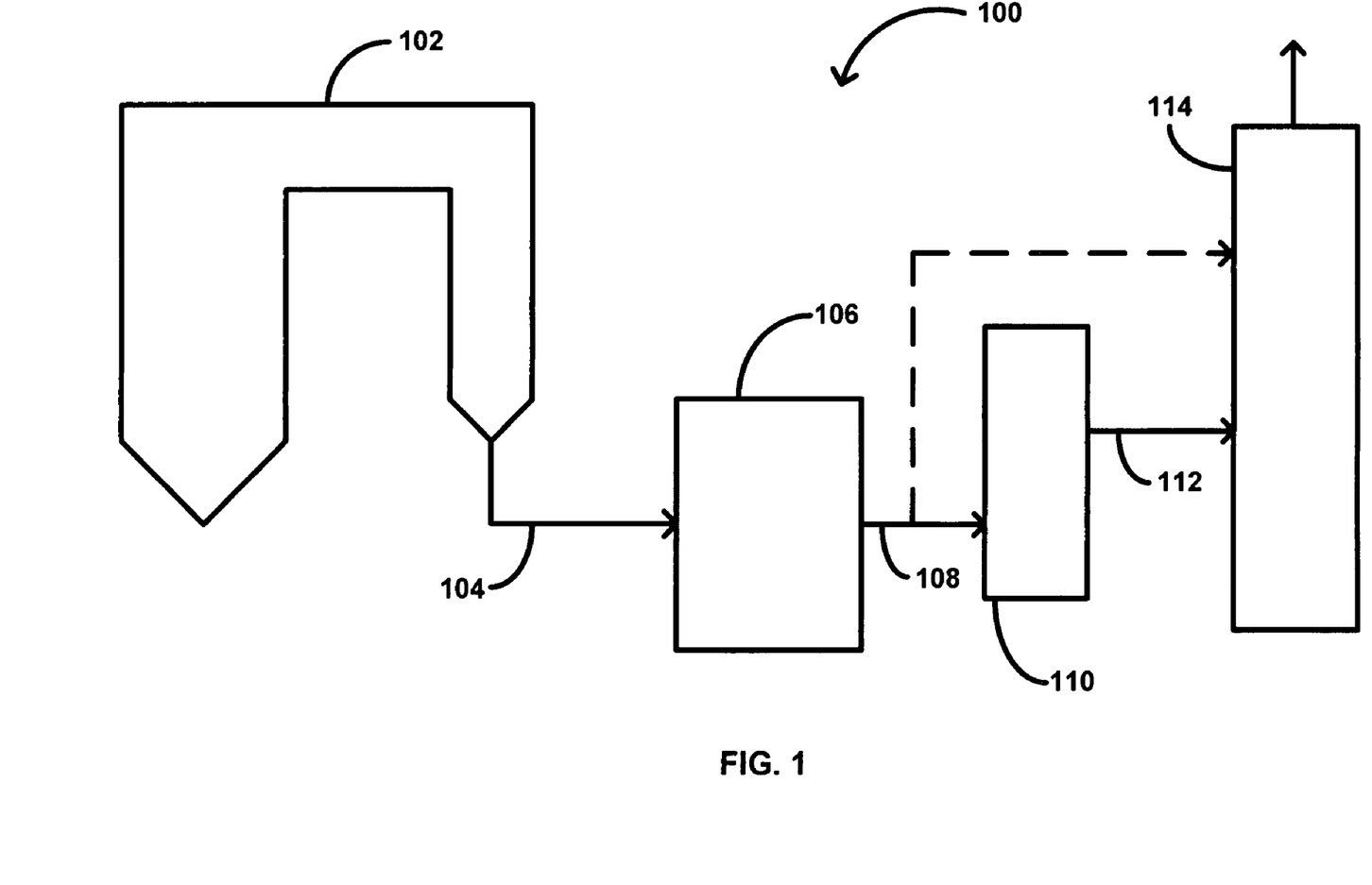
FIG. 1 illustrates a combustion process in which various embodiments of the present invention may be utilized.

FIG. 1 illustrates a combustion process in which various embodiments of the present invention may be utilized. As shown, a combustion process 100 comprises a combustion device 102, such as a fossil-fuel-fired boiler, that uses air to combust fuel, such as a fossil fuel, for example, coal. The combustion device 102 produces a gas stream in the form of flue gas that exits the combustion device 102 through a combustion device outlet duct 104. The flue gas produced within the combustion device 102 is comprised of air; gaseous products of combustion, such as water vapor, carbon dioxide, oxides of nitrogen and sulfur, halides, organic compounds, mercury, selenium, and other trace metal vapors; and aerosols, including particulate matter or fly ash and in some cases sulfuric acid mist. A primary aerosol collection device 106, such as a particulate collection device (e.g., a wet or dry electrostatic precipitator or a baghouse), is connected to the combustion device outlet duct 104 and removes aerosols and particulate matter from the flue gas. The flue gas then passes from the primary aerosol collection device 106 through an aerosol collection device outlet duct 108 either directly to a stack 114 (as shown by the dashed line) where the flue gas is discharged to the atmosphere or optionally through a scrubber 110, such as a wet scrubber, through a scrubber outlet duct 112, and then to the stack 114. It should be appreciated that this process is only exemplary, and the methods and apparatuses of the present invention generally may be used in connection with any gas stream in any process.

It should be appreciated that the aerosol collection device may be referred to as a "primary" aerosol collection device, which refers to an aerosol collection device that removes the most aerosols from the gas stream downstream of the combustion device relative to any other device in a given process, including, for example, the apparatuses of the present invention. For example, construing the combustion device 102 in FIG. 1 as a coal-fired boiler, the aerosol collection device 106 removes most of the aerosol generated by the coal-fired boiler relative to any other device in the process and, therefore, may be referred to as a primary aerosol collection device. Although, in the case where the scrubber 110 is also utilized, the aerosol collection device 106 is most likely still a primary aerosol collection device as it will remove more aerosol and fly ash than the scrubber 110, even though the scrubber 110 may also remove some fly ash. It should also be appreciated that the aerosol collection device is intended to encompass particulate collection devices as well, such as an electrostatic precipitator or baghouse. Accordingly, the aerosol collection device 106 in FIG. 1 may also function to remove a significant portion of particulate matter or fly ash.

Figure 2:
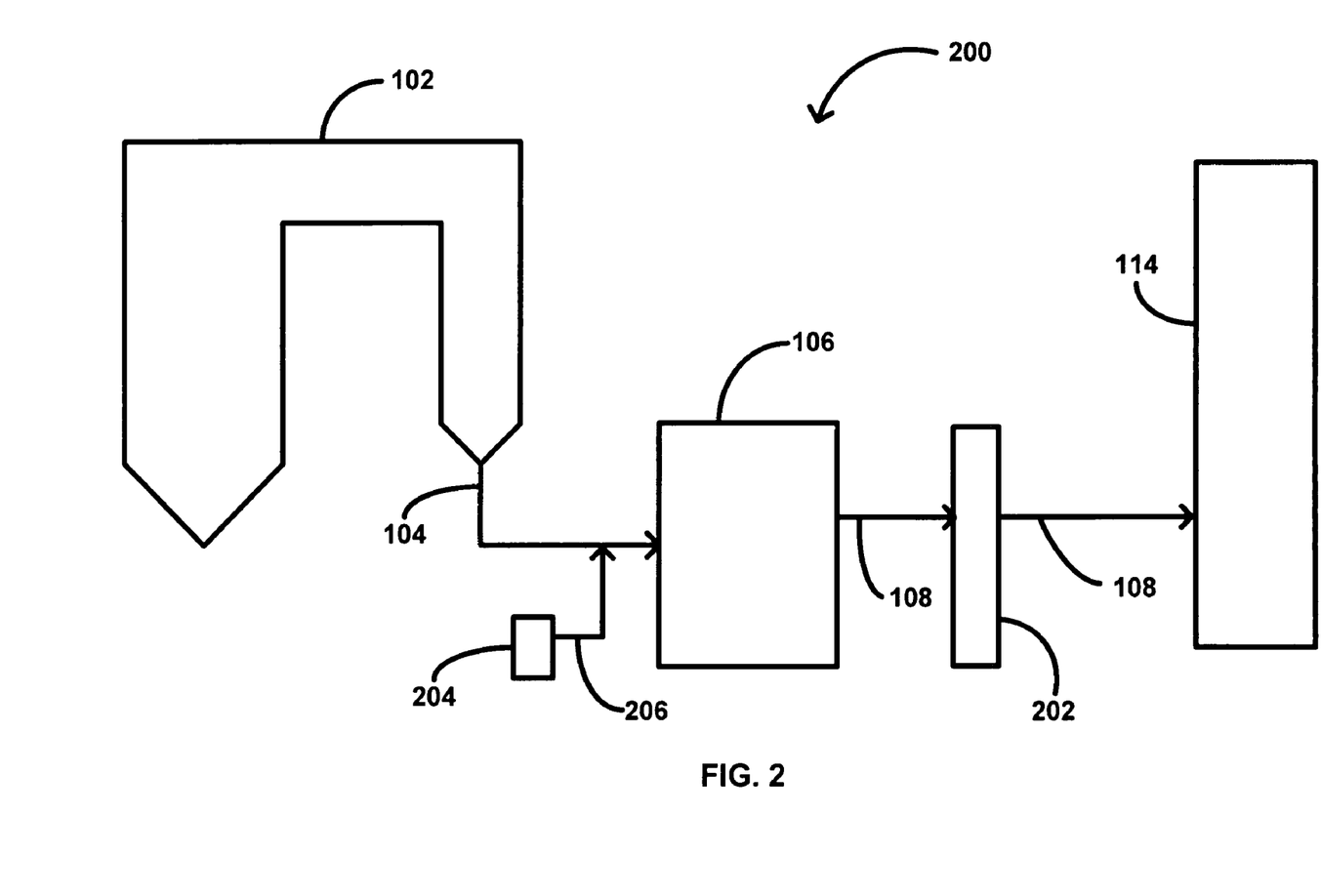
FIG. 2 illustrates a combustion process that incorporates one embodiment of the present invention.

FIG. 2 illustrates a combustion process that incorporates one embodiment of the present invention. As shown, the combustion process 200 is similar to the combustion process shown in FIG. 1 but without a scrubber positioned between the aerosol collection device 106 and the stack 114. In this process 200, the aerosol collection device 106 may be referred to as a primary aerosol collection device and may be any type of aerosol collection device, including, for example, a wet or dry electrostatic precipitator or a baghouse. A polisher 202, made according to one embodiment of the present invention, is positioned downstream of the primary aerosol collection device 106. It should be appreciated that in this FIG. 2, the polisher 202 is simply represented graphically by a box.

Figure 3:
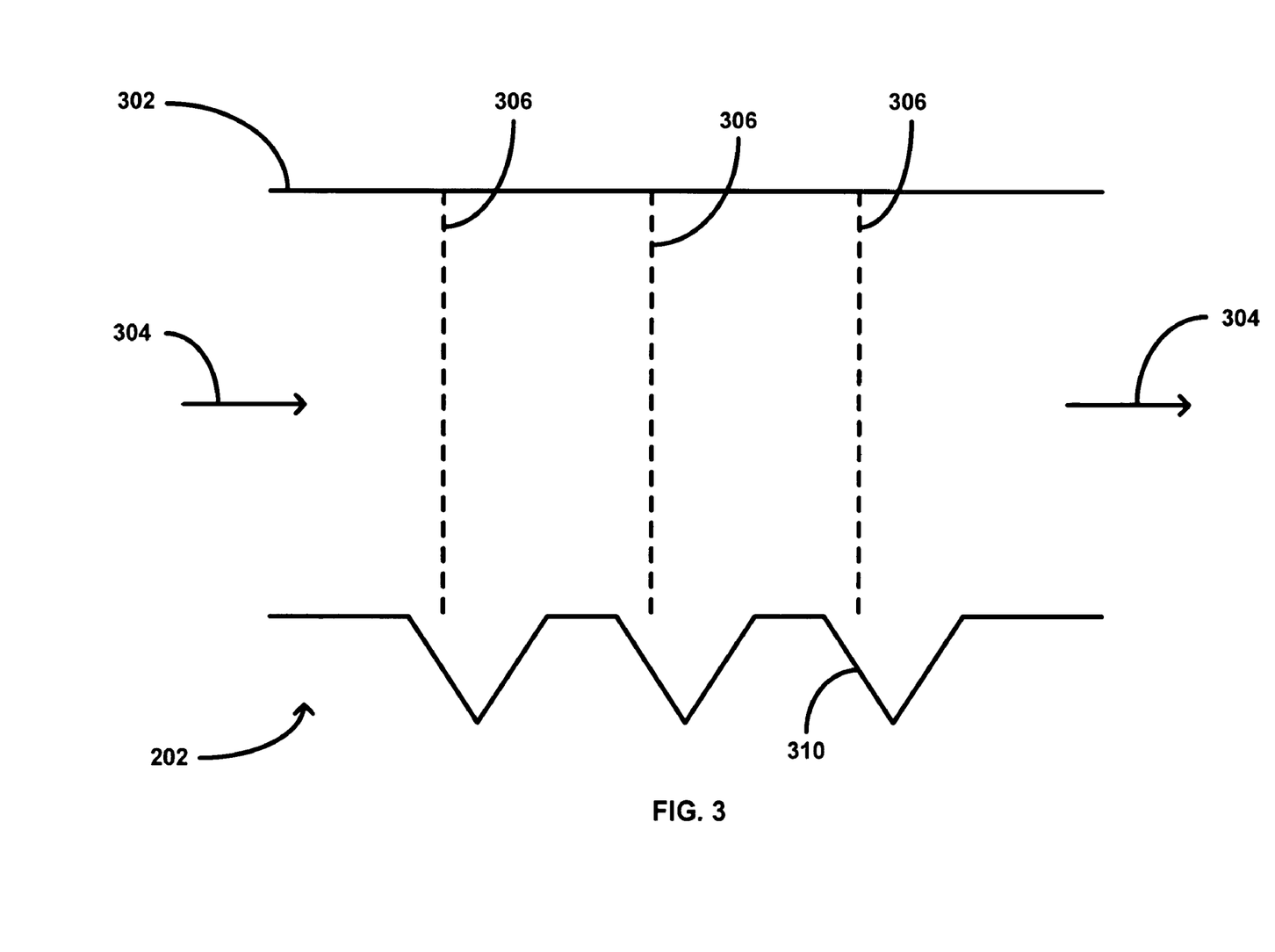
FIG. 3 is a cut-away view of a gas duct and the polisher of FIG. 2.

FIG. 3 is a cut-away view of a gas duct and the polisher of FIG. 2. As shown, the gas passes through the gas duct 302 in the direction shown by the arrows 304. It should be appreciated that a portion of the aerosol and particulate matter in the gas duct has already been removed by the aerosol collection device 106 located upstream of the portion of the gas duct 302 illustrated in FIG. 3. However, that portion of the aerosol and particulate matter that has not been removed by the aerosol collection device 106 would still be in the gas passing through that portion of the gas duct 302 illustrated in FIG. 3.

A plurality of screens 306 are positioned substantially normal to a nominal direction of gas flow 304 through the gas duct 302 and extend across a cross-section of the gas duct 302 such that all of the gas passes through the screens 306. It should be appreciated that in some embodiments, only one screen 306 may be necessary, and in other embodiments, two, three, four, five, or more screens 306 may be used. A significant portion of any aerosols not captured by the primary aerosol collector will be collected in the screen through inertial impaction and by electrostatic forces.

It should be appreciated that if the primary aerosol collection device 106 is an electrostatic precipitator, the particulate matter will be electrically charged, including that portion of the particulate matter that is not collected by the electrostatic precipitator and that passes to the polisher 202. In this case, the charged particles will be easier to collect on the screen 306.

In some embodiments, the screen 306 itself may also be optionally electrically charged to enhance the collection of both neutral and charged aerosols. For example, the screen may comprise a set of parallel wires, wherein each wire has a charge opposite that of wire adjacent to it. Alternatively, the wires may have one charge and the casing holding the wires may have an opposite charge. Alternatively, charged discharge electrodes or rods may be placed in front of the screen to create a potential between the electrodes and the screen. Alternatively, multiple screens may be used in series where each screen has a charge opposite that of an adjacent screen. These various options for charging the screen may be used in any of the embodiments described herein. Nonetheless, it should be appreciated that charging the screen is optional and not required.

Each screen 306 comprises a single screen having a plurality of holes that allow the gas to pass through the screen 306. The size, shape, and position of the holes in the screen 306 can be varied to optimize the performance of the screen 306 and the gas pressure drop across the screen 306. For example, the holes may be approximately 70 to approximately 7000 mesh wire or woven cloth screens. Alternatively, the screens may be a felted cloth or metal material with a high gas permeability, for example, approximately 100 cfm/ft$^2$ of screen or greater. It should be appreciated that the shape of the holes and the hole pattern may also be varied as desired. For example, the holes could be simple squares or other shapes such a diamond, rectangles, etc. The hole pattern or pitch in the screen may also vary. The materials of construction used for the screen 306 may also be varied and selected based upon the gas composition, such as the corrosivity of the gas, and to optimize the structural integrity of the screen 306. For example, the screen 306 may be constructed from metal wire mesh; woven cloth made from glass, ceramic, carbon, or polymer yarn; or holes punched in a metal or polymer sheet. Given the various options for constructing the screen 306, it should be appreciated that the term "screen" is used throughout generically and should not be construed as limited to, for example, a metal wire screen.

In general operation, the gas stream comprising aerosols, including, for example, particulate matter (or a plurality of particles, particulate, or fly ash) passes through the primary aerosol collection device 106 where a portion of the aerosols and particulate matter is removed from the gas stream. The gas stream then passes from the aerosol collection device 106 to that portion of the downstream gas duct 302 comprising at least one screen 306 where an additional portion of the aerosols, including an additional portion of the particulate matter, are removed from the gas stream. For simplicity, the following operation will be described in terms of a single screen 306, noting that multiple screens 306 may be used.

In those instances where the aerosols, including the particulate matter, in the gas stream are electrically charged by the upstream aerosol collection device 106, further charging of the aerosols and particulate matter is not necessary prior to the gas stream passing through the screen 306. In those instances where the upstream aerosol collection device 106 does not result in electrically charging of the particulate matter, the aerosols and particulate matter may optionally be separately electrically charged at a point upstream of the screen 306. For example, the aerosols and particulate matter that are not removed by the aerosol collection device 106 may be electrically charged downstream of the aerosol collection device 106 but upstream of the screen 306. The aerosols and particulate matter may even be charged upstream of the aerosol collection device 106 even though the aerosol collection device 106 may not utilize such charging. The exact location where the aerosols and the particles are electrically charged can be determined based on operating conditions and physical constraints of the equipment. Methods for charging the aerosols and particulate matter may be done as described above.

As the aerosol particles and any particulate matter passes through the screen 306 at least a portion of the aerosols and particulate matter are collected on the screen 306 by inertial impaction. Accordingly, the screen 306 acts to polish the gas stream by removing an additional portion of the aerosol particles and particle matter relative to the upstream or primary aerosol collection device 106. As noted, the upstream or primary aerosol collection device 106 initially removes a portion of the aerosol particles and particle matter in the gas stream. The screen 306 or plurality of screens 306 if more than one is used then collect a portion of the aerosol particles and particle matter that are not collected by the upstream aerosol collection device 106. In some embodiments, the screen 306 may collect approximately 10% to approximately 90% of the total aerosol particles and particle matter that are not removed by the upstream aerosol collection device 106. In other embodiments, the screen 306 may collect approximately 10% to approximately 50% of the total aerosol particles and particle matter that are not removed by the upstream aerosol collection device 106. In still other embodiments, the screen 306 may collect approximately 10% to approximately 20% of the total aerosol particles and particle matter that are not removed by the upstream aerosol collection device 106. It should be appreciated that in embodiments that utilize more than one screen that these removal percentages refer to the total aerosol particle and particle matter removals across all such screens collectively.

The gas duct 302 may also be configured to have discharge ports 310 that are connected to hoppers (not shown) on its bottom side to collect the aerosol particles and particulate matter collected by the screens 306. In this embodiment, the screens may be attached to mechanical devices (not shown) that shake the screens 306 to dislodge the aerosol particles and particulate matter attached to the screens 306, which is then collected in the hoppers. Alternatively, spray nozzles may be placed in the gas duct 302 adjacent to each screen 306 to spray wash water against the screen to remove collected aerosol particles and particulate matter, which may also be collected in the hoppers. The aerosol particles and particulate matter collected by the hoppers can then be disposed of. Of course, such mechanical cleaning would need to be performed while the system was offline to avoid re-entrainment of the particulate matter. Accordingly, the system could be designed with a gas bypass that would allow individual or groups of screens 306 to be separated from the gas flow for cleaning.

Figure 4:
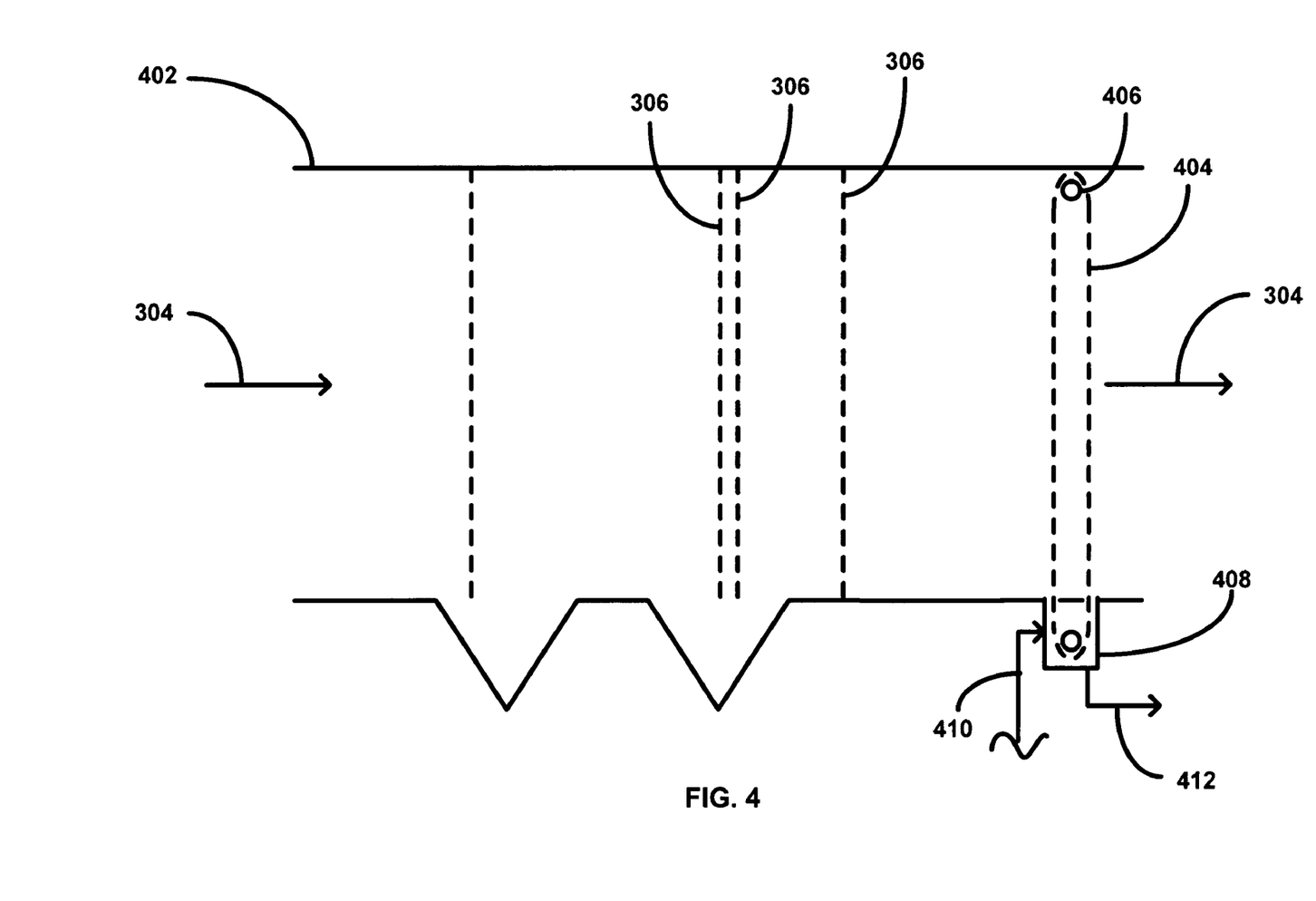
FIG. 4 is a cut-away view of a gas duct and various other embodiments of the polisher of FIG. 2.

FIG. 4 is a cut-away view of a gas duct and various other embodiments of the polisher of FIG. 2. As shown, two or more screens 306 may be positioned next to or adjacent to each other in a gas duct 402. For example, two or more screens 306 may be positioned next to each other such that they are in physical contact. Alternatively, two or more screens may be positioned next to each other such that there is a relatively small space between each screen 306, such as one or more inches, up to one or more feet. In those embodiments where more than one screen 306 is positioned between one or more discharge electrodes 308, such are considered to be next to or adjacent to each other.

Alternatively, or in addition to the single screens 306, a screen 404 may be wrapped around two rollers 406 located at the top and bottom of the gas duct 402. Although one roller 406 is shown as being inside of the gas duct 402, that roller 406 may also be located outside of the gas duct 402. A tank 408 may be connected to the bottom of the gas duct 402 such that the screen 404 may be rotated by the rollers 406 from the gas duct 402 through the tank 408 and back into the gas duct 402. The tank 408 may be filled with water or a wash solution to clean the screen 404 as it rotates through the tank 408. Alternatively, the tank 408 may comprise spray nozzles (not shown) to enhance the cleaning of the screen 402. The tank 408 may be fed with water or a wash solution by a feed line 410 and dirty water or spent wash solution may be discharged from the tank 408 through discharge line 412.

In operation, the screen 404 may be rotated through the tank 408 as desired. For example, such rotation may be done on a regularly scheduled basis, either manually or automatically. Alternatively, rotation may be done continuously or only on an as-needed basis depending upon, for example, the gas pressure drop across the screen 402 or performance in terms of percentage removal of the aerosol particles and particulate matter from the gas stream.

It should be appreciated that in any of the foregoing embodiments, as well as in those described further below, the screen may be coated with a sorbent that acts to adsorb a vapor phase contaminant such as a vapor phase metal, for example, mercury (Hg). In general, the sorbent coating may comprise any composition that adsorbs a given vapor phase contaminant in the gas stream and that can be coating on the screen.

Accordingly, the screen composition may be selected such that the sorbent coating will properly coat or attach to the screen. The choice of sorbent composition will be dependent upon the contaminant to be removed from the gas stream, including its physical properties and characteristics, and the gas stream properties, such as temperature and velocity. For example, if vaporous mercury is the contaminant to be removed from the gas stream, the composition of the sorbent may be carbon or activated carbon. Other sorbent compositions useful in mercury removal are those that also react with the mercury, such as gold, which readily forms an amalgam with mercury, or silver or zinc, which also form amalgams. In another embodiment, the sorbent may be a noble metal. It should be appreciated that mixtures of sorbents having different compositions may also be used. In addition, the sorbent coating may also comprise a composition that upon adsorption chemically reacts with the vapor phase contaminant as well. Further, it should be appreciated that in some embodiments, the screen itself may be constructed from a sorbent material. As noted, using a sorbent coating on the screen may also be combined with electrically charging the screen as described above.

With reference to FIGS. 3 and 4, the screen may be a single screen that is essentially fixed in place within a gas duct. In this case, once the sorbent coating is spent, the screen can be removed from the duct and replaced or the coating can be regenerated and the screen returned to service. Alternatively, if a gas bypass configuration is used, it may be possible to clean the screen and regenerate the sorbent coating without removing the screen from the gas duct. Alternatively still, with reference to FIG. 4, the screen with the sorbent coating may be used in conjunction with rollers 406 and an external tank 408. In this configuration, the sorbent coating may be regenerated by performing whatever cleaning and regenerating steps are necessary in the external tank attached to the gas duct. Once the screen has been cleaned and the sorbent coating regenerated, the screen can be rotated, thereby placing that portion or section of the screen with regenerated sorbent coating back into the gas duct and passing a portion or section of the screen with spent sorbent coating into the external tank for cleaning and regeneration. With reference to the external tank 408, the feed line 410 can be used to feed the required chemicals to the tank 408 for cleaning and regeneration, and the discharge line 412 can be used to discharge the vapor phase contaminant from the system for disposal or further treatment.

It should also be appreciated that in any of the foregoing embodiments, as well as in those described further below, a sorbent may be injected into the gas stream upstream of the particulate collection device or a primary particulate collection device as illustrated in FIG. 2. A container 204 holding a sorbent may be injected into the combustion device outlet duct 104 so that it is entrained into the gas stream. The sorbent is selected to adsorb a given vapor phase contaminant, such as mercury (Hg). At least a portion of the sorbent, with or without adsorbed vapor phase contaminant, is then collected in the primary particulate collection device 106. In those instances in which a portion of sorbent, with or without adsorbed vapor phase contaminant, is not collected by the particulate collection device 106, a screen according to any of the foregoing embodiments, or those described below, may be used to supplement removal of the injected sorbent, with or without adsorbed vapor phase contaminant, which is considered to be particulate matter in the gas stream.

Figure 5:
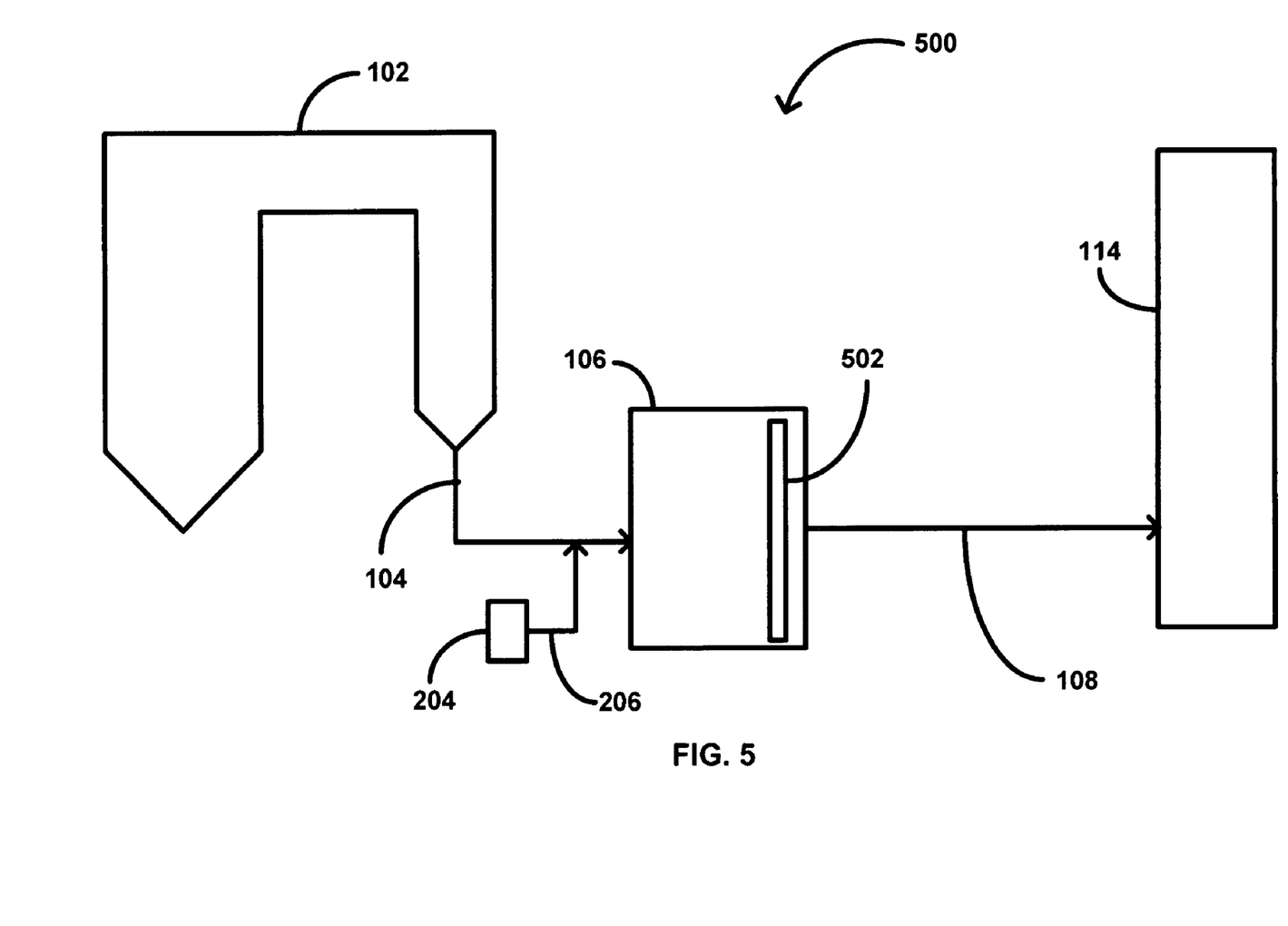
FIG. 5 illustrates another exemplary process according to one embodiment of the present invention.

FIG. 5 illustrates another exemplary process according to one embodiment of the present invention. The process 500 is substantially the same as that illustrated in FIG. 2; however in this embodiment the polisher 502 is housed within the housing of the particulate collection device 106. It should be appreciated that in this FIG. 5, the polisher 502 is simply represented graphically by a box. It should also be appreciated that even though the polisher 502 is located within the housing of the aerosol collection device 106, that portion of the aerosol collection device 106 that collects aerosol particles and particulate matter may still be referred to as a "primary" aerosol collection device relative to the polisher 502 within the same housing.

FIG. 6 is a cut-away view of an electrostatic precipitator illustrating exemplary embodiment of the present invention shown in FIG. 5. The electrostatic precipitator 600 is the aerosol collection device 106 shown in FIG. 5 and may act as a primary aerosol collection device. The electrostatic precipitator comprises a housing 602 that has multiple aerosol collection sections or regions within the housing 602 where aerosol particles and particulate matter are collected. In this embodiment, each aerosol collection section is an electrically charged collection plate 604 that serves to collect aerosol particles and particulate matter. (The corresponding discharge electrodes that charge the aerosols and particulate matter so that they are attracted to and collected on the electrically charged collection plates 604 are not shown.) The housing 602 further comprises an inlet port 606 through which a gas stream enters the electrostatic precipitator 600 as indicated by the directional arrow 608. The housing 602 also comprises an outlet port 610 through which the gas stream exits the electrostatic precipitator 600 as indicated by the directional arrow 612. The bottom of the housing 602 is connected to a plurality of discharge ports 614 that are operated to discharge collected aerosol particles and particulate matter from the collection plates 604 into hoppers (not shown). The collected aerosol particles and particulate matter in the hoppers is then disposed.

At least one screen 616 is positioned within the housing 602 of the electrostatic precipitator 600. In one embodiment, the screen 616 is located downstream of all of the aerosol collection sections or electrically charged plates 604. It should be appreciated, however, that the single screen 616 may be positioned between any of the electrically charged collection plates 604 within the housing 602 of the electrostatic precipitator 600. It should also be appreciated that a second or any number of additional screens may be placed within the housing 602. Such additional screens may be positioned adjacent to each other, either downstream of all of the electrically charged plates 604 or adjacent to each other in between any two of the electrically charged plates 604; separately positioned between any two of the electrically charged plates 604; or any combination thereof such as individual screens 616 between any two of the electrically charged plates 604 or downstream of all of the electrically charged plates 604 and multiple screens adjacent to one another between any two of the electrically charged plates 604 or downstream of all of the electrically charged plates 604. It should be appreciated that additional discharge electrodes may be used upstream of any particular screen 616, in particular, the screen 616 located downstream of all of the electrically charged plates 604.

The screens 616 are the same as those described above in connection with FIGS. 3 and 4 in design, structure, and operation, including the percentage removals described above relative to the total amount of aerosol particles and particulate matter that passes from or exits from the upstream or primary aerosol collection device. In the embodiments where more than one screen 616 is used, the removal percentages described above refer to the total aerosol particles and particulate matter removal across all screens 616. Similar to FIG. 3, the screens 616 may be mechanically vibrated or washed using spray nozzles positioned within the gas duct adjacent to each screen 616 to displace collected aerosol particles and particulate matter from the screen 616. The aerosol particles and particulate matter may then be collected in the hoppers via the discharge ports 614.

Figure 6:
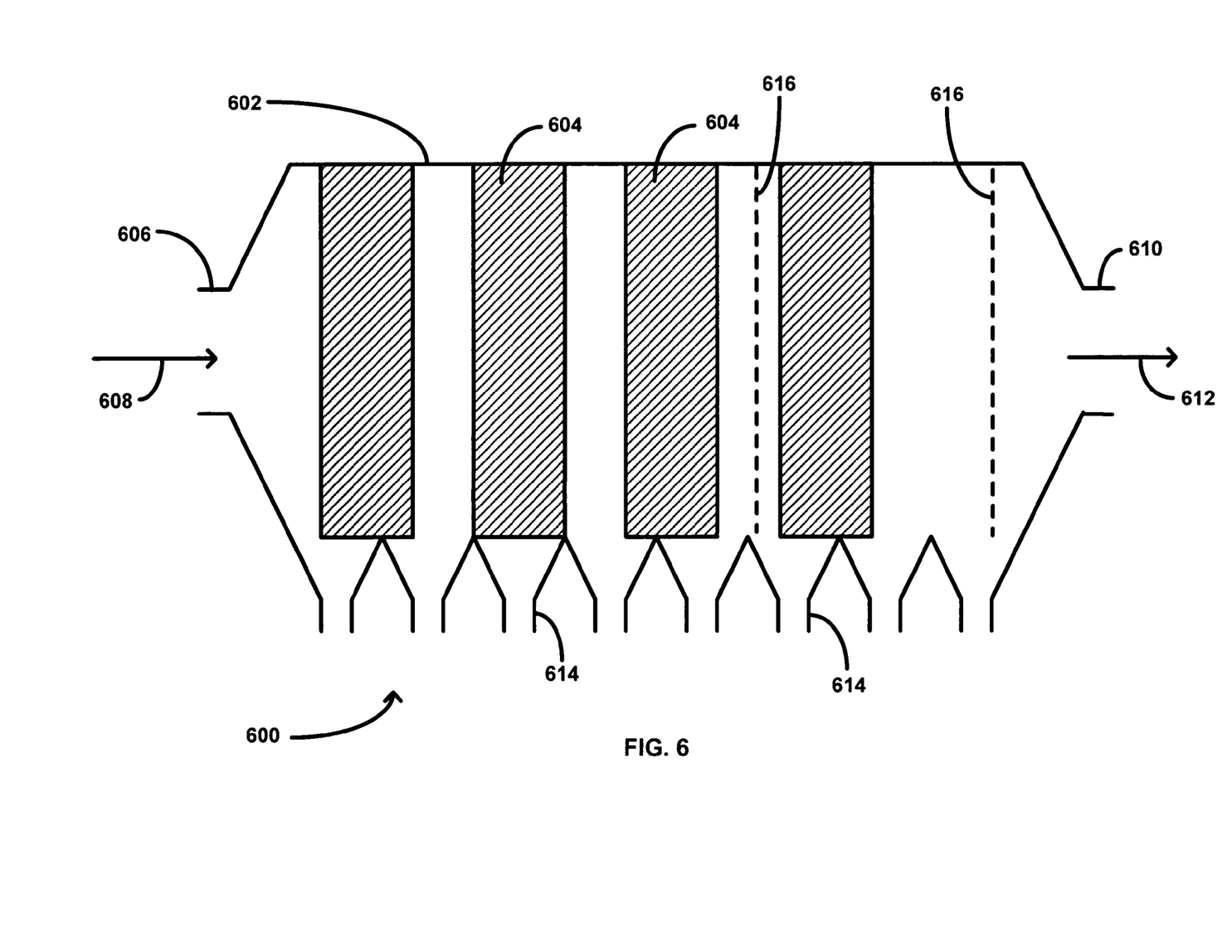
FIG. 6 is a cut-away view of an electrostatic precipitator illustrating exemplary embodiment of the present invention shown in FIG. 5.

Additionally, as noted above, the screens 616 may be electrically charged. Further, the screens 616 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screens 616 located within the housing 602 of the electrostatic precipitator 600.

Figure 7:
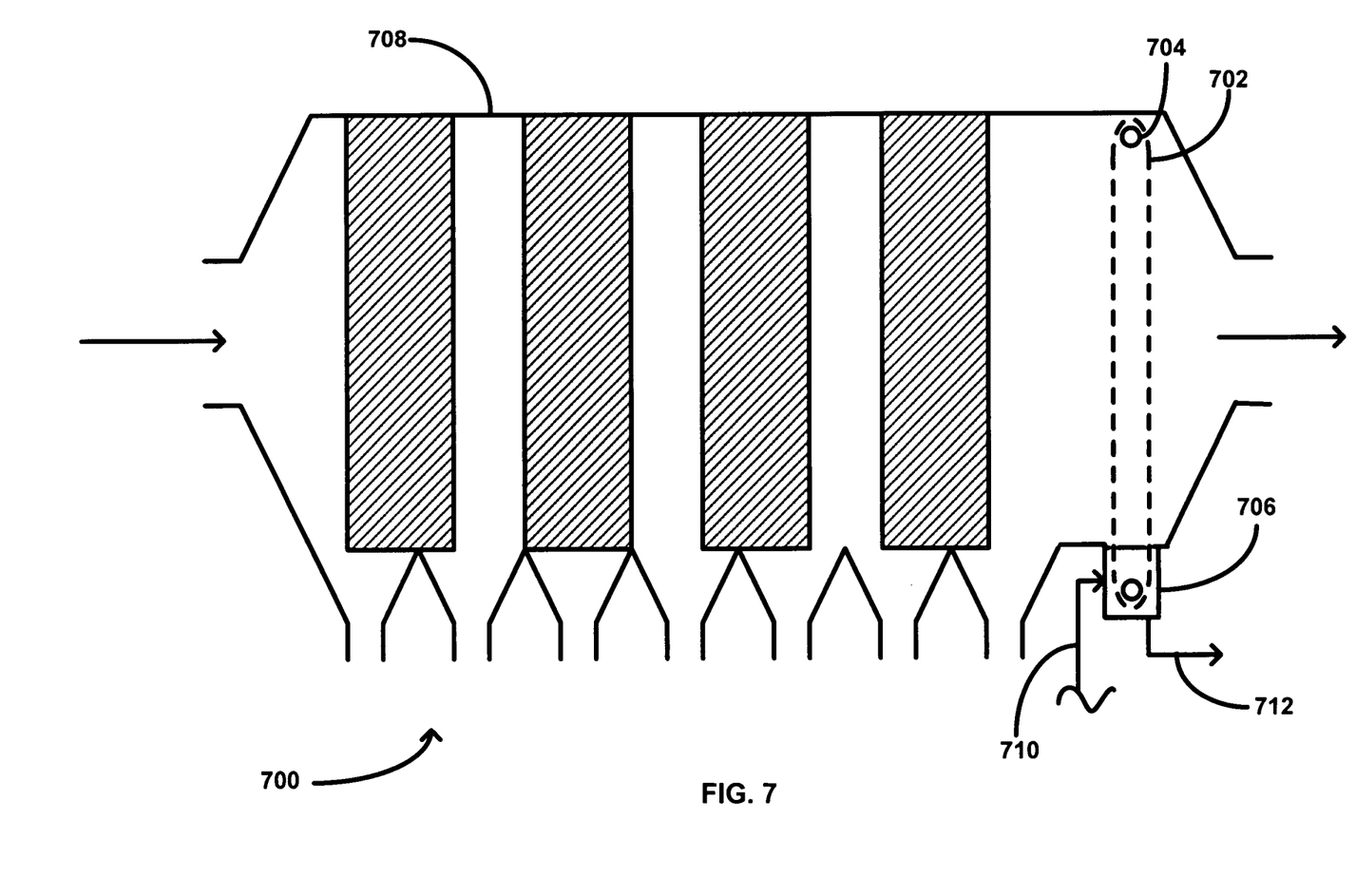
FIG. 7 is a cut-away view of an electrostatic precipitator illustrating another exemplary embodiment of the present invention shown in FIG. 5.

FIG. 7 is a cut-away view of an electrostatic precipitator illustrating another exemplary embodiment of the present invention shown in FIG. 5. The electrostatic precipitator 700 is essentially the same as that as shown in FIG. 6; however, the screen 702 is similar to that illustrated in FIG. 4. In this case, the screen 702 is capable of being rotated using a pair of rollers 704. A tank 706 may be connected to the bottom of the housing 708 of the electrostatic precipitator 700 such that the screen 702 may be from inside the housing 708 through the tank 706 and back into the housing 708. The tank 706 may be filled with water or a wash solution to clean the screen 702 as it rotates through the tank 706. Alternatively, the tank 706 may comprise spray nozzles (not shown) to enhance the cleaning of the screen 702. The tank 706 may be fed with water or a wash solution by a feed line 710 and dirty water or spent wash solution may be discharged from the tank 708 through discharge line 712.

Operation may also be similar to that described in connection with FIG. 4 in that the screen 702 may be rotated through the tank 706 as desired. For example, such rotation may be done on a regularly scheduled basis, either manually or automatically. Alternatively, rotation may be done continuously or only on an as-needed basis depending upon, for example, the gas pressure drop across the screen 702 or performance in terms of percentage removal of the particulate matter from the gas stream. Additionally, in the embodiment where the screen 702 comprises a sorbent coating, the tank 706 may be used in cleaning and regenerating the sorbent coating as described.

Figure 8:
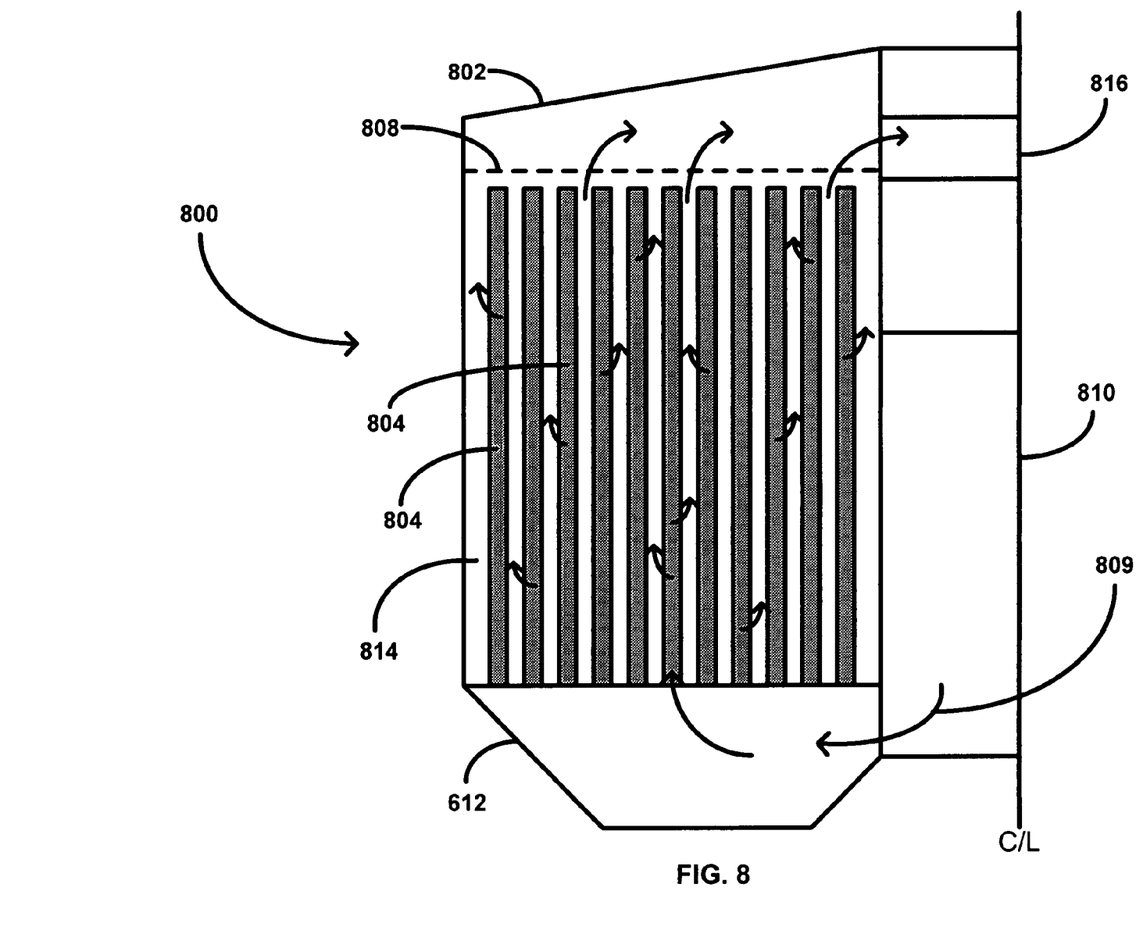
FIG. 8 is a cut-away view of a baghouse illustrating another exemplary embodiment of the present invention shown in FIG. 5.

FIG. 8 is a cut-away view of a baghouse illustrating another exemplary embodiment of the present invention shown in FIG. 5. In this embodiment, a baghouse 800 is utilized as the aerosol collection device 106 referred to in FIG. 5. The baghouse 800, which may also be a reverse-gas baghouse, comprises a housing 802 and a plurality of filter bags 804 in a chamber 806, which may be referred to as aerosol collection sections or as a primary aerosol collection device. A polisher or screen 808 is positioned above the filter bags 804 within the housing 802 of the baghouse 800. It should be appreciated that more than one screen 808 may be located adjacent to each other.

In operation, a gas stream 809, as shown by the arrows, enters the baghouse 800 in the inlet duct 810 and passes to the ash hopper 812 and into the center of the filter bags 804. The gas passes from the center of the filter bags 804 into the chamber 814 surrounding the filter bags 804. The gas then passes through the screen 808, which allows for collection of aerosol particles and particulate matter that is not removed by the filter bags 804. The gas then passes into the outlet plenum 816.

The screen 808 is the same as that described above in connection with FIGS. 3 and 4 in design, structure, and operation, including the percentage removals described above relative to the amount of total aerosol particles and particulate matter that passes from or exits from the baghouse. In the embodiment where more than one screen 808 is utilized, the removal percentages described above refer to particulate matter removal across all screens 808. Similar to FIG. 3, the screen 808 may be mechanically vibrated to displace collected aerosol particles and particulate matter from the screen 808. The aerosol particles and particulate matter may then be collected in the hoppers in the same manner as the particulate matter collected by the filter bags 804.

Additionally, as noted above, the screen 808 may be electrically charged. Further, the screen 808 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screen 808 located within the housing 802 of the baghouse 600.

It should also be appreciated that it may be possible to utilize a screen that can be rotated outside of the housing 802 of the baghouse 800 in a manner similar to that as described in connection with FIG. 7, except that the rotation of the screen would be in a horizontal direction. Further, in order to rotate the screen through a tank an additional set of rollers would be necessary to direct the rotating screen from a horizontal position to a vertical position so that the screen could enter a tank that may hold a liquid for cleaning the screen or regenerating a sorbent coating on the screen.

Figure 9:
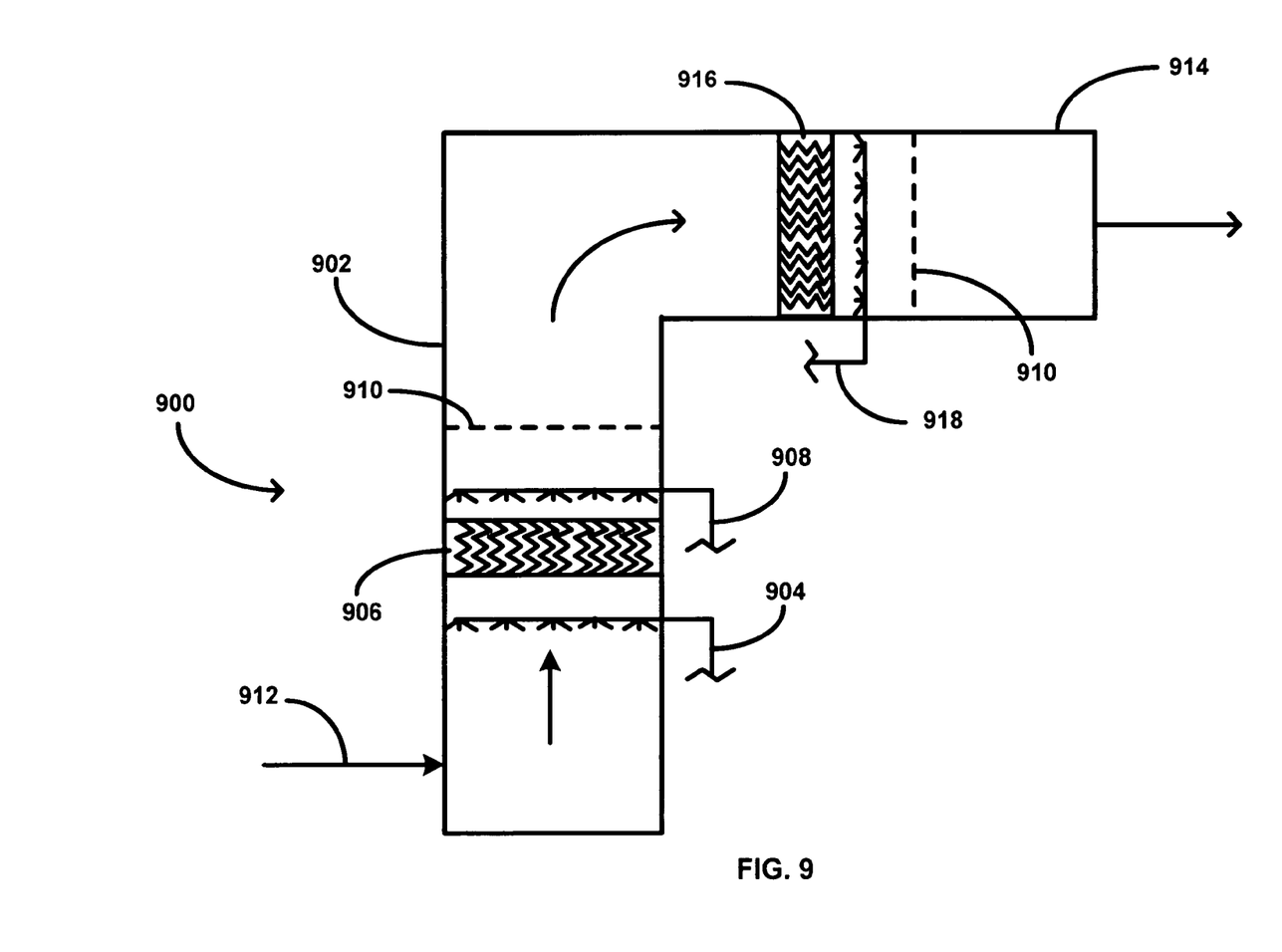
FIG. 9 is a cut-away view of a scrubber illustrating another exemplary embodiment of the present invention.

FIG. 9 is a cut-away view of a scrubber illustrating another exemplary embodiment of the present invention. With reference to FIG. 1, the scrubber 110 is further illustrated in this FIG. 9. In this embodiment, a counter-current wet scrubber 900 comprises a housing 902, a bank of spray nozzles 904, and a vertical mist eliminator section 906 with a corresponding bank of mist eliminator wash nozzles 908. A polisher 910, such as a screen, is positioned within the housing 902 where the gas flow is essentially in a vertical direction and above the vertical mist eliminator section 906. It should be appreciated that more than one screen 910 may be utilized in this location.

In operation and with reference to FIG. 9, a gas stream containing aerosol particles and particulate matter passes through a aerosol collection device where aerosol particles and particulate matter are removed. The gas stream 912, as shown by the arrows, then enters the bottom of the scrubber 900 and travels up through the scrubber and contacts the scrubbing solution dispensed by the spray nozzles 904. The gas 912 then passes through the vertical mist eliminator 906 and through the screen 910 where aerosol particles and particulate matter are removed. The gas then exits the scrubber 900 through an outlet duct 914. Optionally, the outlet duct 914 may contain a horizontal mist eliminator section 916 and a corresponding bank of wash nozzles 918. A second polisher or screen 910 may be located downstream of the horizontal mist eliminator section 916, which may remove additional aerosol particles and particulate matter. It should be appreciated that more than one screen 910 may also be used in this location. Alternatively, if only one screen 910 is used, such may be located either downstream of the vertical mist eliminator section 906 or the horizontal mist eliminator section 916.

The screens 910 are the same as that described above in connection with FIGS. 3 and 4 in design, structure, and operation, including the percentage removals described above relative to the total amount of aerosol particles and particulate matter that passes from or exits from the aerosol collection device 106 as shown in FIG. 1. In the instance where two or more screens are utilized, the removal percentages described above refer to the total removal obtained across all screens in the scrubber 900, including those in the outlet duct 914. Similar to FIG. 3, the screens 910 may be mechanically vibrated or washed using spray nozzles positioned within the gas duct adjacent to each screen 910 to displace collected aerosol particles and particulate matter from the screen 910. The aerosol particles and particulate matter may then be collected in the scrubbing solution and disposed of with the scrubbing solution.

Additionally, as noted above, the screen 910 may be electrically charged. Further, the screen 910 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screen 910 located within the housing 902 of the scrubber 900.

It should also be appreciated that it may be possible to utilize a screen that can be rotated outside of the housing 902 of the scrubber 900 in a manner similar to that as described in connection with FIG. 7, except that the rotation of the screen 910 located near the vertical mist eliminator section 906 would be in a horizontal direction. Further, in order to rotate this screen 910 through a tank an additional set of rollers would be necessary to direct the rotating screen from a horizontal position to a vertical position so that the screen could enter a tank that may hold a liquid for cleaning the screen or regenerating a sorbent coating on the screen. Rotation of a screen 910 located in the outlet duct 914 could be accomplished in a manner similar to that described in connection with FIG. 7.

Various embodiments of the invention have been described above. The Descriptions are intended to be illustrative of various embodiments of the present invention and are not intended to be limiting. It will be apparent to one of skill in the art that modifications may be made to the invention as described without departing from the scope of the claims set out below. For example, it is to be understood that although the various embodiments have been described as removing both aerosol particles and particulate matter that these embodiments may be used to remove aerosol particles alone in those cases where particulate matter may not be present or present in sufficient quantities, or vice versa. In those cases where there is virtually no particulate matter present, it should be appreciated that the removal percentages described above would refer to the total removal of the aerosol particles and vice versa. Further, although the invention has been described in some embodiments using mercury as an exemplary vapor phase contaminant, any contaminant including other trace metal contaminants may be removed by the present invention and that more than one such contaminant may be removed in some embodiments of the present invention. It should also be appreciated that the present invention is adaptable to existing particulate collecting devices and their respective housings. Furthermore, it is to be understood that although the invention has been described in some embodiments in connection with flue gas streams from coal-fired combustion processes, it is contemplated that the invention may be used in connection with any gas stream containing a contaminant.

What is claimed is:

1. A method for removing additional aerosols from a gas stream that has aerosols previously removed by a primary aerosol collector, comprising:

passing a gas stream comprising a plurality of aerosols and a vapor phase contaminant through a gas duct;

removing a first portion of said plurality of said aerosols using a primary aerosol collector;

passing said gas stream through a screen, wherein said screen comprises a first portion, a second portion, and a sorbent, and wherein said passing of said gas stream through said screen comprises passing said gas stream through said first portion of said screen; passing said second portion of said screen out of said gas duct; regenerating said sorbent on said second portion of said screen during said passing of said gas stream through said first portion of said screen; and returning said second portion of said screen back into said duct and into contact with said gas stream;

collecting at least a second portion of said plurality of aerosols on said screen; and adsorbing a portion of said vapor phase contaminant on said sorbent.

2. The method of claim 1, wherein said collecting said second portion of said plurality of aerosols on said screen comprises collecting approximately 10% to approximately 90% of said plurality of aerosols in said gas stream after said removing of said first portion of said plurality of aerosols with said primary aerosol collector.

3. The method of claim 2, wherein said collecting said second portion of said plurality of aerosols on said screen comprises collecting approximately 10% to approximately 50% of said plurality of aerosols in said gas stream after said removing of said first portion of said plurality of aerosols with said primary aerosol collector.

4. The method of claim 3, wherein said collecting said second portion of said plurality of aerosols on said screen comprises collecting approximately 10% to approximately 20% of said plurality of aerosols in said gas stream after said removing of said first portion of said plurality of aerosols with said primary aerosol collector.

5. The method of claim 1, wherein said collecting said second portion of said plurality of aerosols on said screen produces collected aerosols, and further comprising:

vibrating said screen to dislodge at least a portion of said collected aerosols.

6. The method of claim 1, wherein said removing said first portion of said plurality of aerosols comprises removing approximately 50% to approximately 99.9% of said plurality of aerosols.

7. The method of claim 6, wherein said removing said first portion of said plurality of aerosols using said primary aerosol collector comprises removing said first portion of said plurality of aerosols using an electrostatic precipitator.

8. The method of claim 6, wherein said removing said first portion of said plurality of aerosols using said primary aerosol collector comprises removing said first portion of said plurality of aerosols using a wet scrubber.

9. The method of claim 6, wherein said removing said first portion of said plurality of aerosols using said primary aerosol collector comprises removing said first portion of said plurality of aerosols using a fabric filter.

10. The method of claim 6, wherein said removing said first portion of said plurality of aerosols using said primary aerosol collector comprises removing said first portion of said plurality of aerosols using in combination an electrostatic precipitator and a wet scrubber.

11. The method of claim 6, wherein said removing said first portion of said plurality of aerosols using said primary aerosol collector comprises removing said first portion of said plurality of aerosols using in combination a fabric filter and a wet scrubber.

12. The method of claim 1, wherein said aerosols comprise fly ash.

13. The method of claim 1, wherein said aerosols comprise sulfuric acid mist.

14. The method of claim 13, wherein said aerosols further comprise fly ash.

15. The method of claim 1, wherein said sorbent is disposed on said screen.

16. The method of claim 1, wherein said screen consists essentially of said sorbent.

17. The method of claim 1, wherein said vapor phase contaminant comprises mercury and said sorbent comprises carbon.

18. A method for removing additional aerosols from a gas stream that has aerosols previously removed by a primary aerosol collector, comprising:

passing a gas stream comprising a plurality of aerosols and a vapor phase contaminant through a gas duct;

injecting a sorbent into said gas stream upstream of said primary aerosol collector to produce injected sorbent;

adsorbing at least a portion of said vapor phase contaminant on said injected sorbent;

removing a first portion of said plurality of said aerosols using a primary aerosol collector;

passing said gas stream through a screen; and collecting at least a second portion of said plurality of aerosols and at least a portion of said injected sorbent on said screen;

wherein said screen comprises at least two portions and wherein said passing of said gas stream through said screen comprises passing said gas stream through said first portion of said screen, and further comprising:

passing said second portion of said screen out of said gas duct;

regenerating said sorbent on said second portion of said screen during said passing of said gas stream through said first portion of said screen; and returning said second portion of said screen back into said duct and into contact with said gas stream.

19. A method for removing additional aerosols from a gas stream that has aerosols previously removed by a primary aerosol collector, comprising:

passing a gas stream comprising a plurality of aerosols and a vapor phase contaminant through a gas duct;

injecting a sorbent into said gas stream upstream of said primary aerosol collector to produce injected sorbent;

adsorbing at least a portion of said vapor phase contaminant on said injected sorbent;

removing a first portion of said plurality of said aerosols using a primary aerosol collector;

passing said gas stream through a screen; and collecting at least a second portion of said plurality of aerosols and at least a portion of said injected sorbent on said screen;

wherein said screen comprises at least two portions and wherein said passing of said gas stream through said screen comprises passing said gas stream through said first portion of said screen, and farther comprising:

passing said second portion of said screen out of said gas duct;

cleaning said second portion of said screen and said sorbent on said second portion of said screen during said passing of said gas stream through said first portion of said screen; and returning said second portion of said screen back into said duct and into contact with said gas stream.

20. The method of claim 19, farther comprising:

regenerating said sorbent on said second portion of said screen during said passing of said gas stream through said first portion of said screen.

* * * * *